(No Model.)
J. L. DAWES.
FURNACE FOR HEATING GLASS LABELS.
No. 390,844. Patented Oct. 9, 1888.
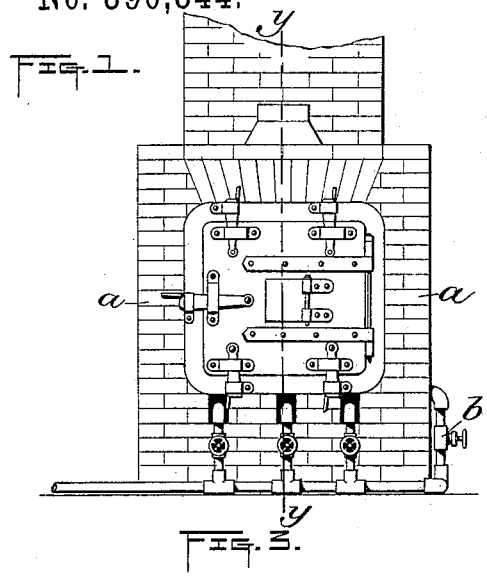
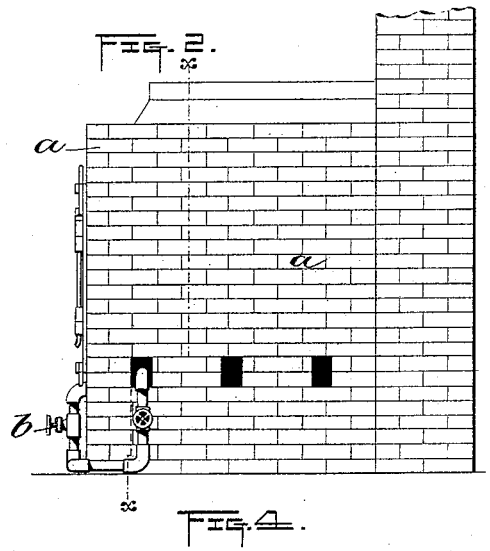
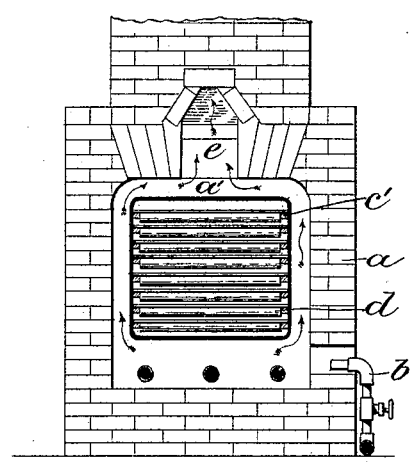
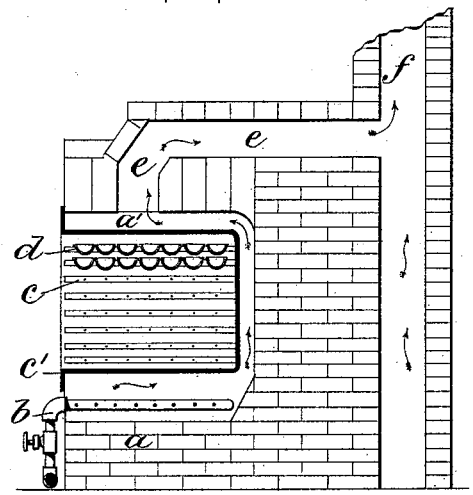
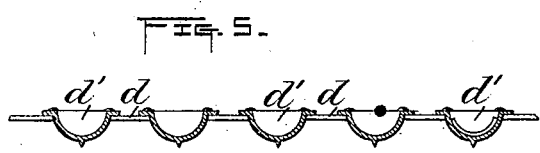
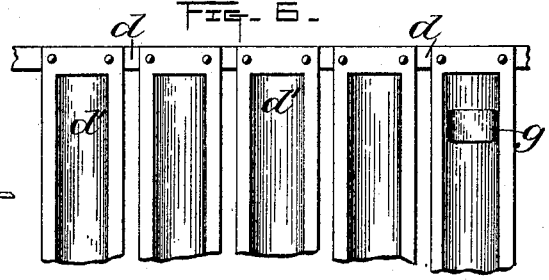
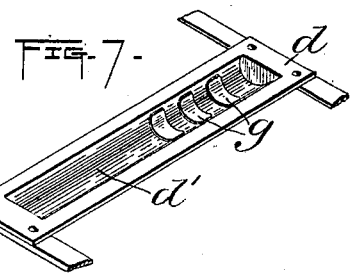
Witnesses,
Jno. K. Smith,
N. B. Corwin
Inventor,
John L. Dawes,
by W. Bakewell & Sons
his Attorneys.
N. PETERS, Photo-Lithographer, Washington, D. C.

UNITED STATES PATENT OFFICE.

JOHN L. DAWES, OF PITTSBURG, PENNSYLVANIA.

FURNACE FOR HEATING GLASS LABELS.

SPECIFICATION forming part of Letters Patent No. 390,844, dated October 9, 1888.

Application filed September 12, 1887. Serial No. 249,455. (No model.)

*To all whom it may concern:*

Be it known that I, JOHN L. DAWES, of Pittsburg, in the county of Allegheny and State of Pennsylvania, have invented a new and useful Improvement in Furnaces for Heating Glass Labels; and I do hereby declare the following to be a full, clear, and exact description thereof, reference being had to the accompanying drawings, forming part of this specification, in which—

Figure 1 is a front elevation of the furnace. Fig. 2 is a side elevation. Fig. 3 is a vertical section on the line $x\,x$ of Fig. 2. Fig. 4 is a vertical section on the line $y\,y$ of Fig. 1. Fig. 5 is a cross-section of the tray. Fig. 6 is a plan view of the same, partially broken away; and Fig. 7 is a perspective view of a portion of the same.

Like letters of reference indicate like parts wherever they occur.

Glass druggist-labels for bottles have heretofore been first formed of thin curved plates of glass which conform to the sides of the bottle and are decorated or marked on their inner or concave surface by gold-leaf laid on in the usual manner, after which the label is affixed to the side of the bottle. This method is expensive and requires skilled labor, which, however, is obviated by my improvement, which I will now describe, so that others skilled in the art to which it appertains may employ the same.

After the thin glass plates have been formed in the usual manner, I mark or decorate the inner concave surface with a solution of gold known as "Glanze gold," which, being in a liquid state, is laid or painted on the glass surface with a brush. After this has been done, it is necessary to subject the glass and gold paint thereon to the action of heat, which brings out a bright clear gold surface on the part painted. This is done in the furnace shown in the drawings, which furnace consists of the walls $a$ and gas-burner pipe $b$, situate in the lower part or fire-chamber of the furnace. Above this burner are horizontal racks $c$ in a close chamber, $c'$, which racks support the trays $d$. A flue, $e$, leads from the chamber $a'$ to the stack $f$, which stack is provided with a suitable damper. The trays $d$ are fitted with concave troughs $d'$, the curvature being the same as the curvature of the glass labels, so that the labels shall not lose their shape under the action of the heat. After the labels $g$ have been painted, as hereinbefore described, they are placed in the troughs $d'$ of the trays $d$, which trays are then placed in the racks $c$ of the furnace until the heat brings the paint to a bright gold color and unites the same to the glass. The trays are then removed and the labels are ready to be used in the usual manner.

Although the troughs $d'$ in the trays $d$ are shown having their concave surface uppermost, they may be reversed; but I prefer the former mode as producing the best results.

Having thus described my invention, what I claim, and desire to secure by Letters Patent, is—

A furnace for heating glass labels when marked or ornamented with a metal solution, having concave trays for the reception of the labels, substantially as and for the purposes described.

In testimony whereof I have hereunto set my hand this 1st day of September, A.D. 1887.

JOHN L. DAWES.

Witnesses:
W. B. CORWIN,
JAMES K. BAKEWELL.